(12) United States Patent  
Soeda et al.

(10) Patent No.: US 7,310,159 B1  
(45) Date of Patent: Dec. 18, 2007

(54) IMAGE OUTPUTTING SYSTEM

(75) Inventors: Haruo Soeda, Tokyo (JP); Yoshiki Kawaoka, Asaka (JP); Hiroyuki Yoshinaga, Asaka (JP)

(73) Assignee: Fujifilm Corporation, Tokyo (JP)

(*) Notice: Subject to any disclaimer, the term of this patent is extended or adjusted under 35 U.S.C. 154(b) by 1296 days.

(21) Appl. No.: 09/707,765

(22) Filed: Nov. 8, 2000

(30) Foreign Application Priority Data

Nov. 8, 1999 (JP) ................................. 11-316599

(51) Int. Cl.
G06F 3/12 (2006.01)
G06K 15/00 (2006.01)

(52) U.S. Cl. ..................................... 358/1.15; 358/1.14
(58) Field of Classification Search ............... 358/1.15, 358/1.14, 1.13, 1.12, 1.16, 1.9, 1.4, 406, 358/405, 426.82, 437; 355/407, 408, 403, 355/40, 27

See application file for complete search history.

(56) References Cited

U.S. PATENT DOCUMENTS

| | | | | |
|---|---|---|---|---|
| 4,888,618 A | * | 12/1989 | Ishikawa | 399/39 |
| 5,784,149 A | | 7/1998 | Kawaoka | 355/35 |
| 6,031,629 A | * | 2/2000 | Shibuya et al. | 358/1.9 |
| 6,048,117 A | * | 4/2000 | Banton | 400/120.09 |
| 6,297,873 B1 | * | 10/2001 | Furuya | 355/40 |

FOREIGN PATENT DOCUMENTS

| | | |
|---|---|---|
| JP | 5-75667 | 3/1993 |
| JP | 06183112 A | 7/1994 |
| JP | 6-328760 A | 11/1994 |
| JP | 7-256895 A | 10/1995 |
| JP | 10-65861 A | 3/1998 |
| JP | 11-188861 A | 7/1999 |
| JP | 11-289454 A | 10/1999 |

* cited by examiner

Primary Examiner—Douglas Q. Tran
(74) Attorney, Agent, or Firm—Birch, Stewart, Kolasch & Birch, LLP

(57) ABSTRACT

An image outputting system that can keep the printed image quality always in good condition by correcting printing color tone based on printing color correcting information received via a network. The image outputting system comprises: an image outputting apparatus including a flat-bed scanner for reading an image, printers for printing the image, a network interface or a modem connectable with external devices via a network, and a correcting device for correcting printing color tone based on printing color correcting information received via the network; and a network server connected to the network for sending the printing color correcting information to the image outputting apparatus via the network. Thus, the network server controls the printing unit based on status information acquired from the image outputting apparatus and always keep the printed image quality in good condition.

5 Claims, 6 Drawing Sheets

IMAGE OUTPUTTING SYSTEM

BACKGROUND OF THE INVENTION

1. Field of the Invention

The present invention relates to an image outputting system, and in particular, a self-manipulating image outputting system that is installed in locations such as stores and amusement facilities connected to a network.

2. Description of Related Art

Japanese Patent Laid-Open No. 6-183112 describes a printing system that can be manipulated remotely to print when a small error occurred in a printing unit. Also, Japanese Patent Laid-Open No. 5-75667 describes a communication processing system that can notify to a server process of an abnormality of a printer and present appropriate messages to a remote user.

In prior art self-manipulating image outputting apparatuses, since management of printing materials was not done at all, printed image quality varied due to temperature and humidity of environment. When an administrator of the self-manipulating image outputting apparatus tries to correct changes of the printed image quality, trial and error are done in correcting the image quality, thereby not only necessitating time for correction but also causing problems of stability of the printed image quality.

Printing systems of the above-described Japanese Patent Laid-Open No. 6-183112 and the Japanese Patent Laid-Open No. 5-75667 acquire error information of a printer remotely and only deal with the error in accordance with the error situation.

SUMMARY OF THE INVENTION

It is therefore an object of the present invention to control a printing unit via a network server based on status information acquired from an image outputting apparatus and to provide an image outputting system that can always achieve good printed image quality.

In order to achieve the above-described object, the present invention is directed to an image outputting system, comprising: an image outputting apparatus comprising: a reading device which reads an image; a printing device which prints the image; a network connecting device connectable to an external device via a network; and a correcting device which corrects printing color tone based on printing color correcting information received via the network; and a network server connected to the network for sending the printing color correcting information to the image outputting apparatus via the network.

In accordance with present invention, the network server can control the printing unit based on status information acquired from the image outputting apparatus, thereby the printed image quality is allowed to be kept in good condition.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

The preferred embodiment of the image outputting system according to the present invention will be described with reference to the accompanying drawings.

Figure 1:
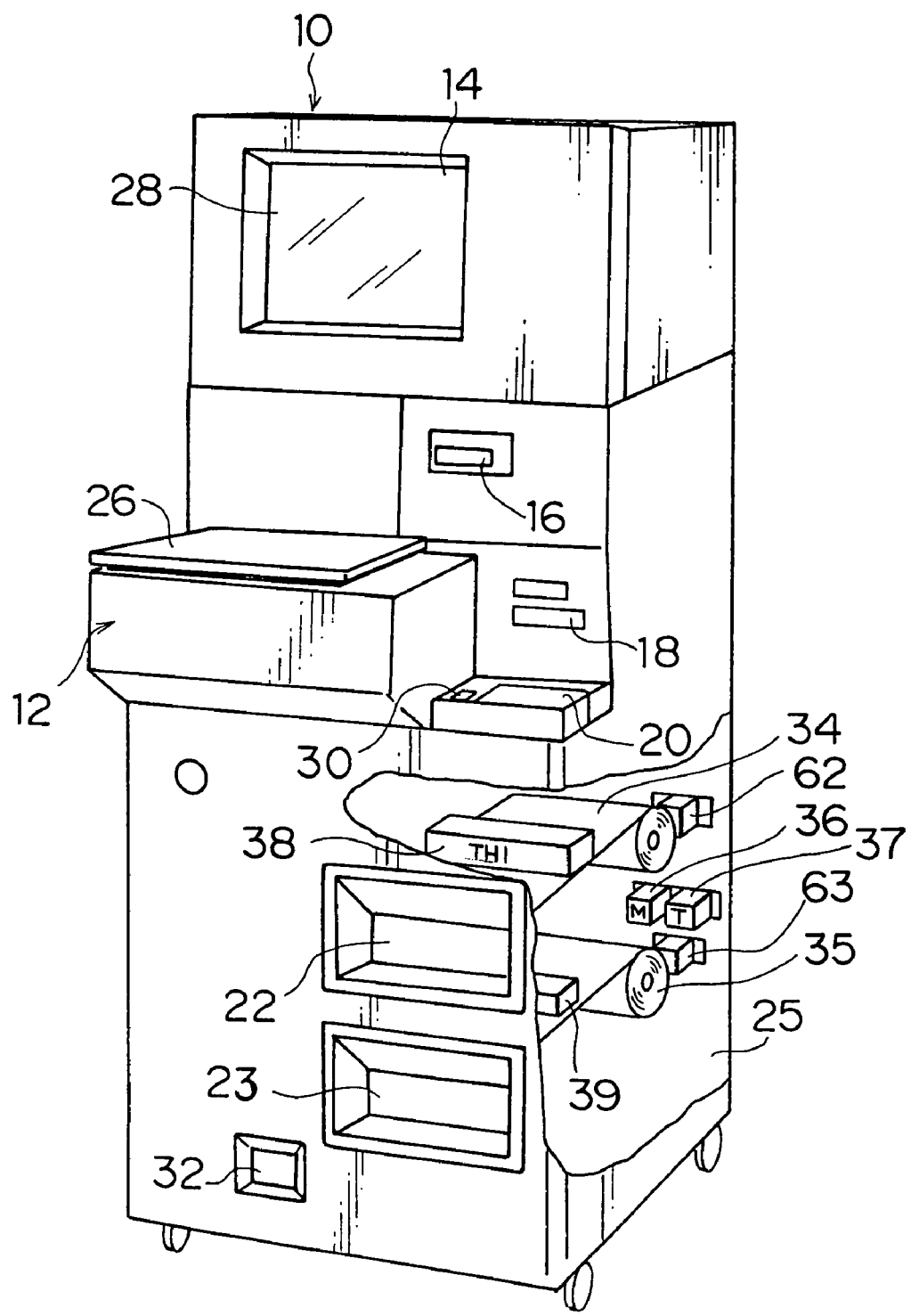
FIG. 1 shows a perspective view of an image outputting system which the present invention is implemented.

FIG. 1 shows a perspective view of an image outputting apparatus which the present invention is implemented.

Referring to FIG. 1, this image outputting apparatus 10 comprises e.g., a flat-bed scanner 12 for inputting an image, a display unit 14, a floppy disk drive 16 for inputting and outputting image data or character data, a memory card inserting unit 18, a film scanner 20 for inputting an image from a silver salt film, printers 22 and 23 for printing. Each of these elements are integrated into a box body 25 to form a single apparatus.

The flat-bed scanner 12 is used for both an image inputting device and a character inputting device. Details of the flat-bed scanner 12 is not shown. But the flat-bed scanner 12 comprises a glass plate for loading an original document thereon, a light source for illumination, and image sensor for converting an optical image to electrical signal, and a reducing optical system for leading a light from the document to the image sensor. Upon inputting an image from a photograph (an image document) and inputting characters from e.g., hand-written character document, a pressing cover 26 of the flat-bed scanner 12 is lifted and the photograph or the hand-written character document is loaded onto the glass plate to be scanned.

A display unit 14 comprises of e.g., a CRT display or a crystal-liquid display, and a touch panel 28 is arranged in the displaying portion. Various manipulations of the system can be done using this touch panel 28, and just touching the buttons according to manipulation guides displayed on the screen enables the manipulations.

A floppy disk drive 16 is provided as one of the image inputting and outputting device. Image data created with e.g., PCs, is recorded in a floppy disk, and the floppy disk drive 16 is used for inputting image data from a floppy disk.

A memory card inserting unit 18 is also provided as one of the image inputting and outputting device. In order to comply with image data taken via e.g., a digital camera, image data recorded in a recording media with a predetermined format such as a PC card and a SmartMedia, is attached to a memory card inserting unit 18, thereby the image data is directly read from the recording media to be printed out. Forms of the recording media is not limited in particular, and various forms such as flash memory card, IC card, floppy disk, magneto-optical (MO) disk, and stick memory may be used, and a driver for the form of the recording media may be provided.

A film scanner 20 is means for inputting an image from a cartridge film that comply with 24 mm Advanced Photo System (APS). Deposited negative film is mounted to a predetermined inserting unit with a whole cartridge, thereby the film is automatically loaded so that the film image is converted to an electronic image data by an image sensor (not shown). A film scanner complying with other films such as 35 mm films may be used.

Printers 22 and 23 correspond to the image outputting device. The upper unit 22 is for printing A5/A6 size paper and the lower unit 23 is for printing stickers. Thermo-auto chrome (TA) type printer is used for the printers 22 and 23, and printing papers 34 and 35 that are wrapped in rolls are used for the printing paper, and they are printed in designated density for each color using thermal heads 38 and 39 during the printing process. Other than normal papers, TA paper designated for stickers in which an adhesive layer is formed in a single side of the printing paper and which the adhesive layer is covered by a stripping paper may be used. After the printing is completed, the paper is cut in a predetermined paper size by a paper cutting device, and the resulted printed object is let out from one or more ejecting pit of the printer 22 and/or the printer 23.

The printing papers 34 and 35 are equipped inside the image outputting apparatus 10. A humidity sensor 36, a temperature sensor 37, and a bar-code sensors 62 and 63 for reading unique information printed in the printing papers 34 and 35 are provided in proximity to the printing papers 34 and 35.

The apparatus shown in FIG. 1 may be located in stores, where it may be used as a printing machine that provides printing services run by self-manipulation. Upon providing the printing service, an user inserts a fee determined for a type of the printing service to a coin slot 30, and the user inputs an image from the image inputting device such as the flat-bed scanner 12 in accordance with a manipulation guide displayed on the screen of the display unit 14 and also the user selects a synthesizing template and/or the user inputs characters, according to a procedure which will be described herein later on. Thus, the synthesizing template and/or characters are synthesized with the input image, thereby the synthesizing image is printed out. Element 32 of FIG. 1 is a change-return opening.

Figure 2:
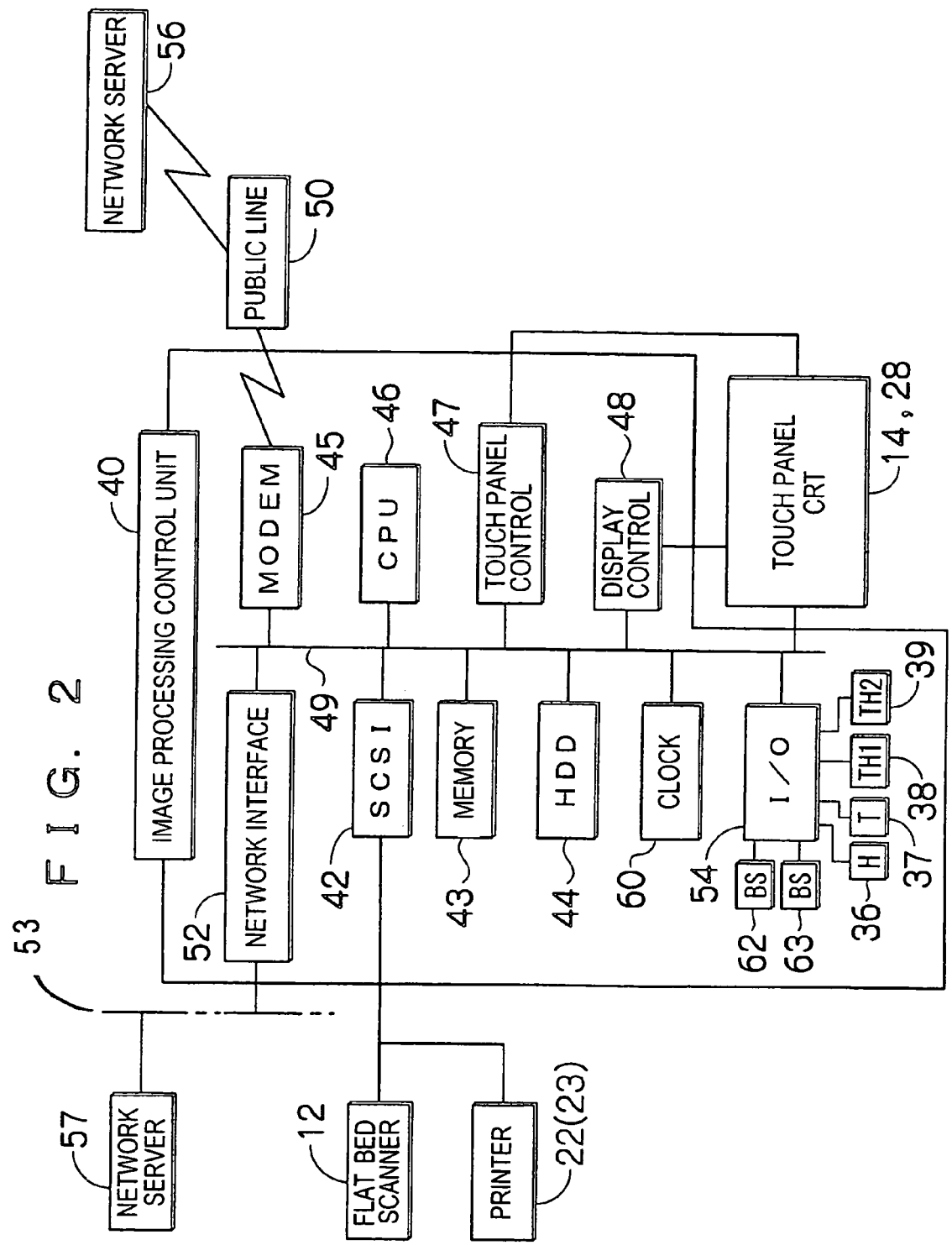
FIG. 2 shows a block diagram of a system configuration of the image outputting apparatus shown in FIG. 1.

FIG. 2 shows a block diagram of a system configuration of the image outputting apparatus shown in FIG. 1. Referring to FIG. 2, an image processing control unit 40 includes a SCSI interface 42, a memory 43, a hard disk drive 44, a modem 45, a CPU 46, a touch panel control unit 47, a display control unit 48, a network interface 52, an I/O 54, and a clock 60. Each of these peripheral circuit units are connected to a bus 49. CPU 46 does various operations and determinations while serving as a control device for controlling each circuit units integratedly.

Image processing control unit 40 is connected to the flat-bed scanner 12 and the printers 22 and 23 via the SCSI interface unit 42. Although not shown in FIG. 2, a film scanner 20 and a media driver of PC cards/SmartMedias may be connected to the image processing control unit 40 via a SCSI interface unit 42.

Display unit 14 is controlled by the display control unit 48. Touch panel 28 is controlled by the touch panel unit 47.

Hard disk drive 44 stores e.g., a control program in accordance with the present system, data for a plurality of synthesizing templates (template data), and temperature and humidity history data. The synthesizing template includes a template that includes no template image (i.e., a template without a background). In these no background templates, only areas for synthesizing with characters (the character locating area) is set. The data for the synthesizing template may be added and updated using e.g., CD-ROMs and communicating functions.

The image outputting apparatus 10 is connectable to public lines via a modem 45, and is able to receive data from e.g., mobile phones (not shown) and to transmit data regarding e.g., temperature and humidity, to an external apparatus such as a network server 56 installed in a remote location. It can also connect to a network 53 installed in a distant location via a network interface 52 to connect to a network server 57.

I/O 54 is connected to a humidity sensor 36 for measuring humidity in proximity to the printing papers 34 and 35, a temperature sensor 37 for measuring the temperature, a sensor such as bar-code sensors 62 and 63 for reading printing characteristics information unique to the printing papers 34 and 35, and thermal heads 38 and 39. Signals of each sensors which are provided to the I/O 54 are able to be read by a CPU 46 via a bus 49, and printing densities of the thermal heads 38 and 39 are able to be controlled via the I/O 54 according to instructions from the CPU 46.

Clock 60 presents the time and the date, and the CPU 46 is able to refer to the data of the clock 60 via the bus 49 and modify the time to a correct value.

The operation of the above-described image outputting apparatus will be described.

Figure 3:
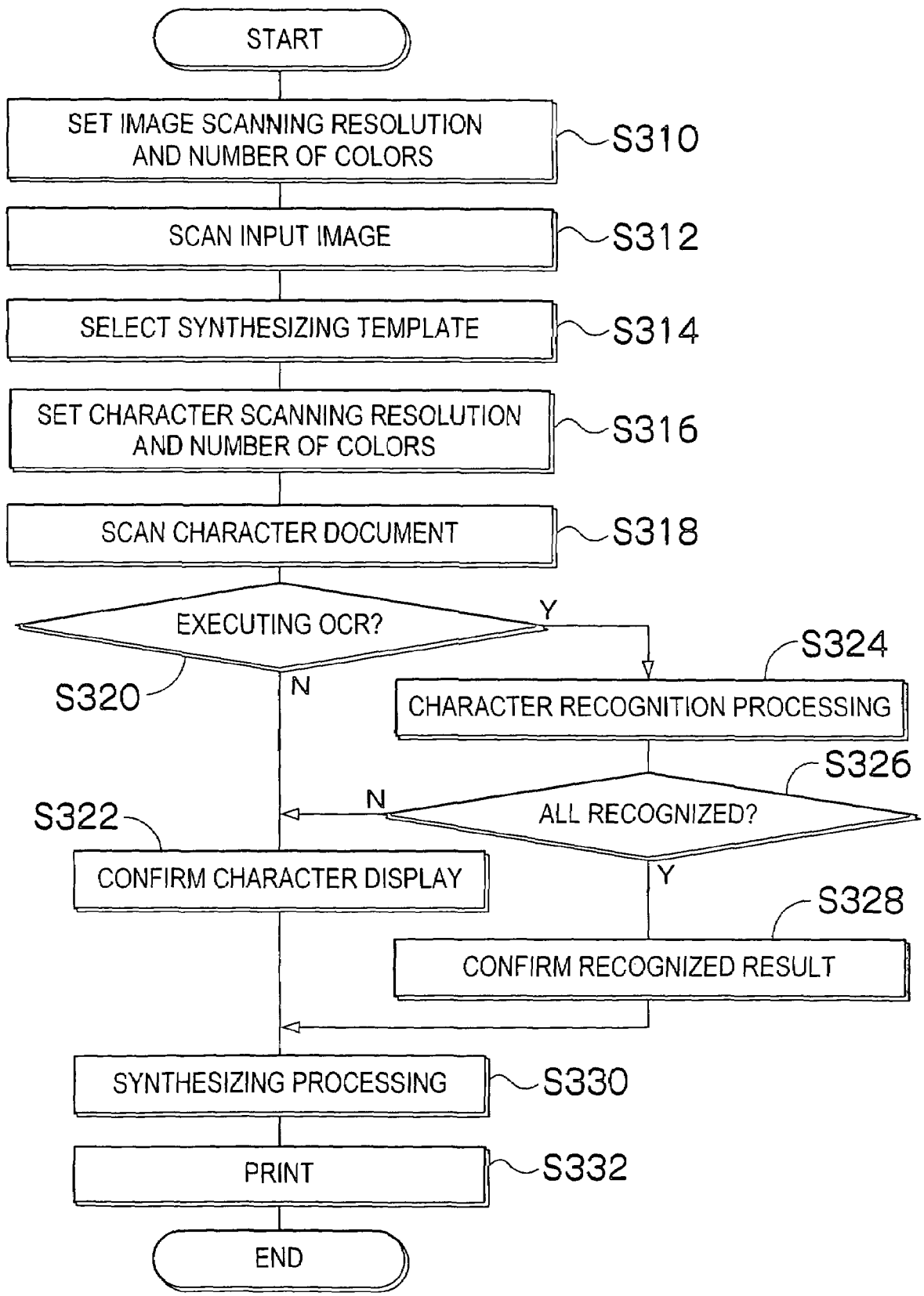
FIG. 3 shows a flowchart of a procedure of synthesizing process of hand-written characters.

FIG. 3 shows a flowchart of a procedure of synthesizing process of hand-writing characters. Referring to FIG. 3, after the process begins, first, the CPU 46 sets the image scanning resolution and the number of colors of the flat-bed scanner 12 to a predetermined condition suitable for reading photo images according to a control program (step S310). For example, 600 dpi, true color 24 bits (16770 thousand colors) may be set.

Then, reading operation of a picture loaded onto a glass plate of the flat-bed scanner 12 (scanning of an inputting image) will be done (step S312). Then, a screen for selecting the synthesizing templates is displayed on a screen of the display unit 14 (step S314). A user selects a desired template by manipulating a touch panel 28 while looking into the screen.

After selecting a synthesizing template, the setting of the image scanning resolutions of the flat-bed scanner 12 and number of colors are modified to a predetermined condition suitable for reading hand-written character document (step S316). For example, 72 dpi and 8 bits (256 colors) may be set. A user may then replace the document of the flat-bed scanner 12 and set a character document representing hand-written characters onto the glass plate.

Size of the document can be an arbitrary size smaller than the maximum reading size of the flat-bed scanner 12. The flat-bed scanner 12 includes a document size recognizing device for recognizing the document size automatically.

After preparing for reading the hand-written character document, reading operation of the character document will be done (step S318). During this character image reading operation, since the number of colors of the scanner and the resolution is decreased compared with a reading operation of the image document, the scanning speed is higher.

After reading the character document, the process determines whether to do an OCR processing or not (step S320), and the process branches according to the determination. That is, if the user desires to synthesize the content of the hand-written characters with the input image as is, the user manipulates the touch panel 28 to select for invalidation of the OCR function. Otherwise, if the user desires to synthesize characters converted into fonts that are prepared in the system, the user manipulates the touch panel 28 to select for validity of the OCR function. A plurality of kind of fonts may be prepared to be selected by the user.

If it is determined that the OCR should not be done according to the selection result of the user ("NO" determination), the result read by the character document scanning is displayed on the screen of the display unit 14 such that the user is confirmed (step S322). Then, if the user inputs an instruction for approval, the synthesizing process of the input image, the synthesizing template and the characters will be done (step S330).

Figure 4:
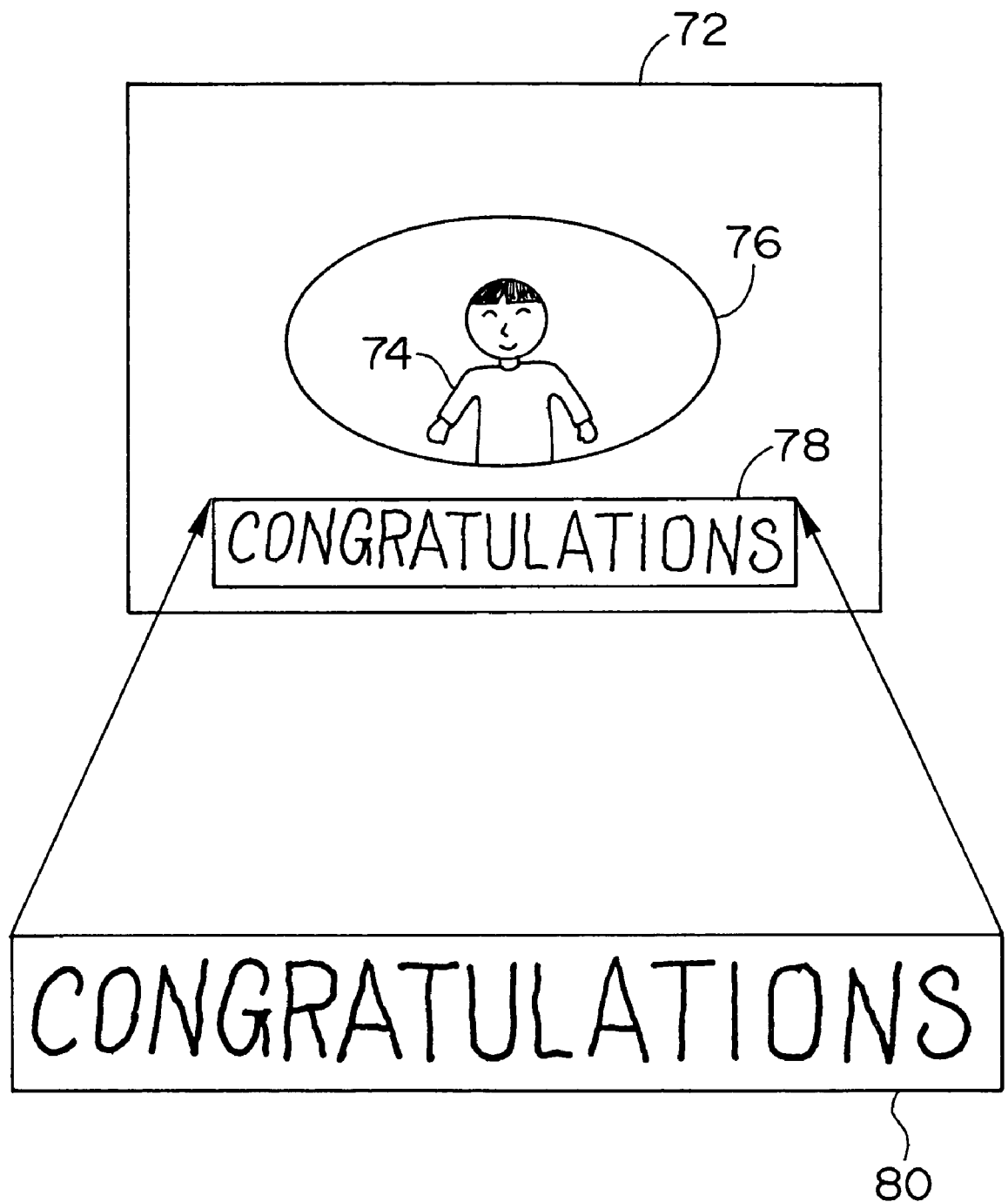
FIG. 4 shows a situation where hand-written characters are synthesized into an image with a template.

As shown in FIG. 4, an image fitting area 76 for fitting an input image 74, and a character putting area 78 is preset in a synthesizing template 72. The character string of a hand-written document 80 read from the flat-bed scanner 12 is size-adjusted (resized) so as not to lose a portion of the characters in the character putting area 78, and then synthesized with the input image 74 together with the synthesizing template 72. Then, printing of the image acquired by the synthesizing will be done (step S332).

Otherwise, if it is determined in the step S320 that the OCR should be done ("YES" determination), character recognition process will be done based on the content read by the character document scanning (step S324). Then, it is determined whether the character recognition for all the characters has succeeded or not (step S326). If the recognition for all the characters has succeeded, the recognition result is displayed on the screen such that the user is confirmed (step S328). If the user inputs an instruction for approval, a synthesizing process of the characters converted into the predetermined fonts will be done based on the input image, the synthesizing template and the character recognition (step S330). Then, the printing of the synthesized image will be done (step S332).

If there was a character not successfully recognized in step S326, after the warning thereof, the process proceeds to step S322 and the content of the read hand-written characters is displayed as is for confirmation. If the user approves, a synthesizing process of the hand-written characters will be done, and then the printing operation. Thus, if there was a character not recognizable by the OCR, the whole character string is synthesized as the raw hand-written characters, thereby a partial replacement of portions not recognizable to e.g., unusual alternative symbols will not be done.

Although a hand-written character document is read in the above description, e.g., hand-written illustrations and pictures may be input using a similar method.

Other methods for inputting characters will be described.

As described referring to FIG. 2, the image outputting apparatus 10 includes a modem 45 and is connectable to public lines 50. A telephone number or an e-mail address is pre-allocated to the image outputting apparatus 10. The user inputs characters using an external device such as a mobile phone and a personal digital assistant (not shown) (user terminal), and then the character data is sent to the telephone number or the e-mail address so that the characters are input to the image outputting apparatus 10.

If the image outputting apparatus 10 received the character data via the public lines 50, it decodes character codes and expands them into information strings. Then, the information strings are synthesized in a predetermined character putting area 78 in the synthesizing template 72. The image resulted by the synthesizing is image processed and printed out by a printer.

Figure 5:
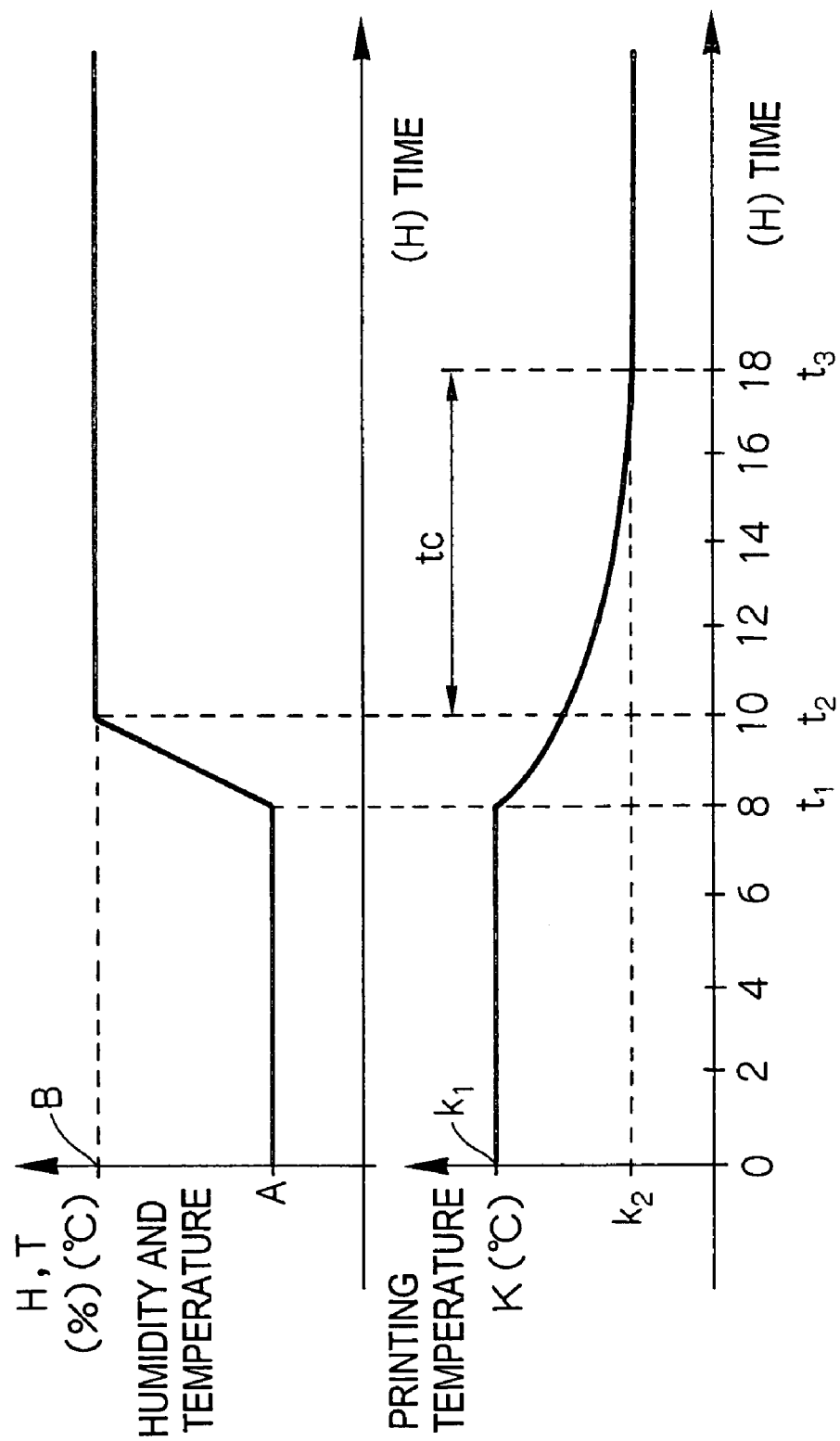
FIG. 5 shows a method for correcting printing temperature of a thermal head during printing.

FIG. 5 shows a method for correcting printing temperature of thermal heads 38, 39 during printing. Generally, printing characteristics of the printing papers 34 and 35 change due to e.g., temperature and humidity during the printing and history of the temperature and the humidity. In an installing location where variation of temperature and humidity is large, if there was not appropriate correction to the printing characteristics, color repeatability (identity) during the printing will be worse, thereby rendering the printing result not be valuable as a product.

As shown in FIG. 5, as the output value of the humidity sensor 36 or the temperature sensor 37 increases in time $t_1$ to $t_2$, the printing temperature of the thermal heads 38 and 39 is set such that the temperature decreases from $k_1$ to $k_2$ in time equal to time constant $t_c$, thereby worsening of the color repeatability for each of the colors, R, G and B is advantageously prevented during printing at any time. Advantageously, variation curve of the printing temperature then may be calculated to be equal to the temperature and humidity history characteristics for the printing papers 34 and 35. In addition, since the printing temperature K has an unique initial value regardless of the manufacturing lot of printing papers 34 and 35 and the characteristics of materials used for manufacturing, a code that represents corrected value may be described in a portion of a printing paper roll such that the bar-code sensors 62, 63 can read the unique code so as to use for calculating for the correction of the printing temperature.

The correction value for the printing temperature may be calculated by multiplying an one or more order coefficient, or by adding a zero order coefficient, with e.g., printing characteristics value unique to the printing paper or the measured humidity value and temperature value. In addition, the correction value may be obtained by applying a non-linear correction, or from various printing paper characteristics data accumulated in network servers 56 or 57.

Figure 6:
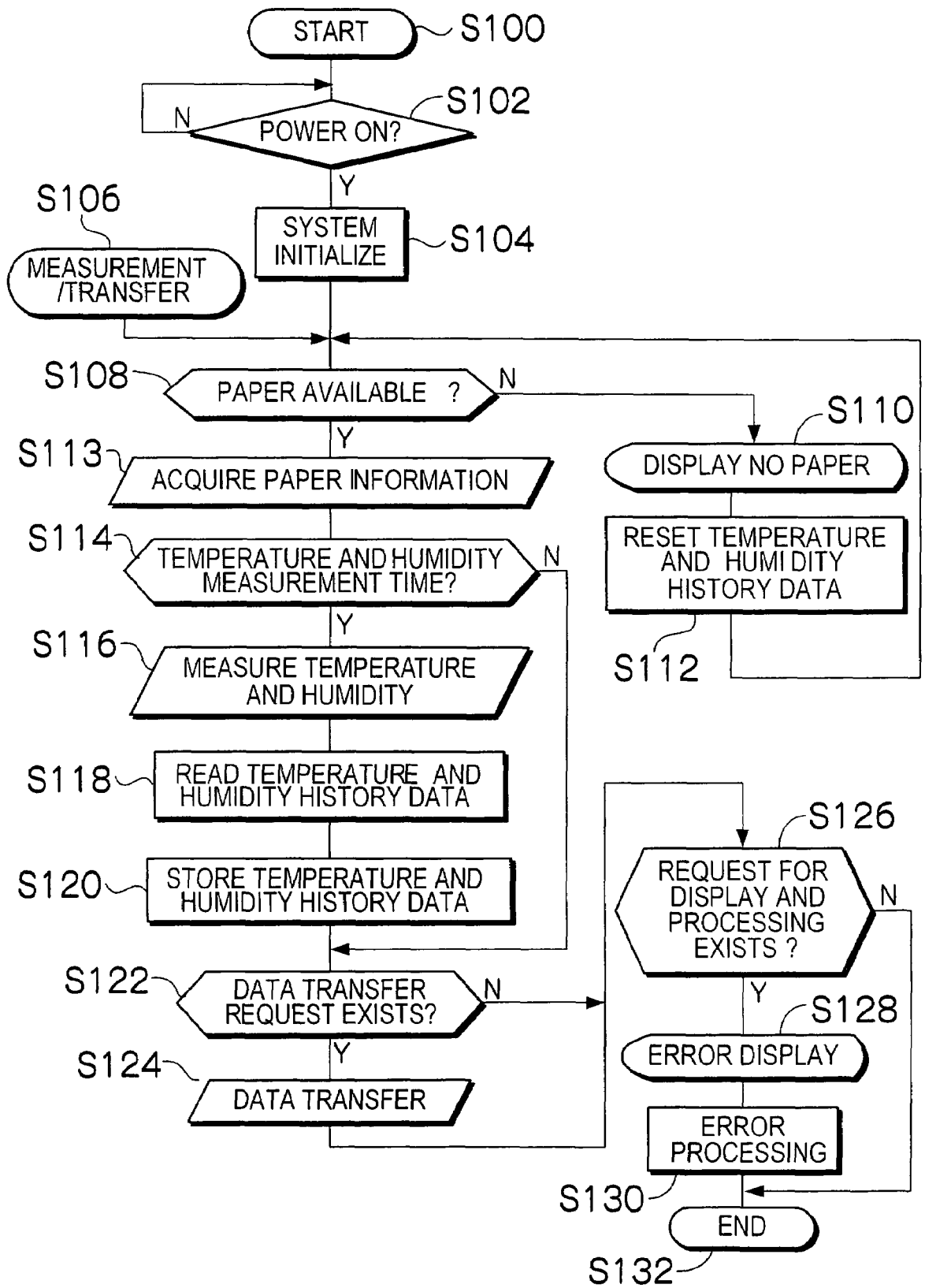
FIG. 6 shows a flowchart of a process of temperature and humidity history data of an image outputting system and a communicating process with a network according to the present invention.

FIG. 6 shows a flowchart of a process of temperature and humidity history data of an image outputting system 10 and a communicating process with a network according to the present invention.

If the image outputting apparatus 10 is at its initial state, the program jumps to step S100, "START."

The next step S102, "POWER ON?" determines whether the power of the image outputting apparatus 10 is "ON" or not. If the power is not "ON," the process returns to step S102. Otherwise, if the power is "ON," the process proceeds to the next step S104, "SYSTEM INITIALIZE." In this step S104, the CPU 46 reads executing programs and various constants from a storing device of the hard disk drive 44 while the peripheral devices are started on and the initial settings are done.

After the system initialization is done, or if the program is jumped to step S106, "MEASUREMENT/TRANSFER" subroutine, then the process proceeds to the next step S108, "PAPER LEFT?".

This step S108 determines whether the printing paper 34 or 35 shown in FIG. 1 is in its available state or not. If the printing paper 34 or 35 is depleted and is not available, the process proceeds to step S110, "DISPLAY NO PAPER" to display in the display unit 14 shown in FIG. 1 that the printing paper 34 or 35 is not in its available state such as to notify the user of it. Then, the process proceeds to step S112, "RESET TEMPERATURE AND HUMIDITY HISTORY DATA" and does a process that resets the temperature and humidity history data of the depleted printing paper and the data unique to the printing paper, and then proceeds to step S108.

If the printing papers 34 and 35 are available in step S108, the process proceeds to step S113, "ACQUIRE PAPER INFORMATION" and the CPU 46 reads the printing characteristics information unique to the printing papers 34 and 35.

The next step S114, "TEMPERATURE AND HUMIDITY MEASUREMENT TIME?" determines whether the time the clock 60 shown in FIG. 2 is adding up reached a time for measuring temperature and humidity. If it reached a time for measuring temperature and humidity, the process proceeds to step S116, "MEASURE TEMPERATURE AND HUMIDITY" and the CPU 46 acquires temperature and humidity data from the humidity sensor 36 and the temperature sensor 37 via the bus 49 and the I/O 54. Then, in the next step S118, "READ TEMPERATURE AND HUMIDITY HISTORY DATA," the CPU 46 reads history data for temperature and humidity stored in the hard disk drive 44 while it does delay processing represented by e.g., first order delay, taking account for the measured temperature and humidity data, thereby a new temperature and humidity history data is created.

In the next step S120, "STORE TEMPERATURE AND HUMIDITY HISTORY DATA," the created new temperature and humidity history data is stored in the hard disk drive 44. For the next printing process, this new temperature history data is used to correct the temperature of the thermal heads 38 and 39 for printing.

If the storing of the temperature and humidity history data is done in step S120, or if it did not reach the temperature and humidity measurement time in step S114, then the process branches to step S122, "DATA TRANSFER REQUEST EXISTS?". Step S122 determines whether there is a request from the network server 56 or 57 for data transfer. If there is a request from the network server 56 or 57 to the image outputting apparatus 10 for data transfer, then the process proceeds to step S124 "TRANSFER DATA" and transfers the requested data to the network server 56 or 57. For example, the transferring data is e.g., measured temperature or humidity data, usage rate of the image outputting apparatus 10, sales data, and status data. If the data transfer is completed, or if there was no data transfer request, the process proceeds to step S126, "REQUEST FOR DISPLAY AND PROCESSING EXISTS?".

This step S126 determines whether there is a request from the network server 56 or 57 for display processing. If there is a request from the network server 56 or 57 to the image outputting apparatus 10 for display processing, the process proceeds to the next step S128, "ERROR DISPLAY" and displays to the display unit 14 the data with display processing request received from the network server 56 or 57. The displaying data may be a warning or a manipulation instruction that corresponds to temperature, humidity and error status measured by the image outputting apparatus 10, or may be an advertising screen. If the error display is completed, the process proceeds to the next step S130, "ERROR PROCESSING" and may execute error handling processing executable by the image outputting apparatus 10, or may store received printing characteristics correction data, or may download a new processing program, or may execute each instructed operations.

If the processing of step S130 is completed, or if there is no request for display processing in step S126, the process proceeds to step S132, "END" and completes this subroutine.

As described above, the network server acquires information from a plurality of image outputting apparatuses 10 via a network while doing data analysis, thereby allowing more accurately control the image outputting apparatuses 10.

According to the image outputting system of the present invention, since the image outputting system comprises an image outputting apparatus including a read device which reads an image, a printing device which prints the image, a network connecting device connectable with external devices via a network, and a correcting device which corrects printing color tone based on printing color correcting information received via the network, and a network server connected to the network for sending the printing color correcting information to the image outputting apparatus via the network, the network server controls the printing unit based on status information acquired from the image outputting apparatus and always keep the printed image quality in good condition.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image outputting system comprising:
   an image outputting apparatus including:
     a reading device which reads an image;
     a printing device which prints the image;
     a network connecting device connectable to an external device via a network;
     a humidity measuring device which measures humidity in proximity to the printing device; and
     a correcting device which corrects print color, based on printing color correcting information and the measured humidity, wherein the printing device prints the image with the corrected print color; and
   a network server connected to the network for controlling the printing device by sending the printing color correcting information to the image outputting apparatus via the network.

2. The image outputting system according to claim 1, wherein the image outputting apparatus sends to the network server via the network, data of the measured humidity, and the network server sends the printing color correcting information to the image outputting apparatus based on the received data.

3. The image outputting system according to claim 1, further comprising:
   a humidity measuring device which measures humidity in proximity to the printing device; and
   the correcting device corrects printing color based on a history of the measured humidity.

4. The image outputting system according to claim 3, wherein the image outputting apparatus sends to the network server via the network, data of the measured humidity, and the network server sends the printing color correcting information to the image outputting apparatus based on the received data.

5. The image outputting apparatus according to claim 1, wherein the image is a photographic image or characters from a handwritten document.

* * * * *